(12) United States Patent
Bamji et al.

(10) Patent No.: US 7,719,662 B2
(45) Date of Patent: *May 18, 2010

(54) METHOD AND SYSTEM FOR FAST CALIBRATION OF THREE-DIMENSIONAL (3D) SENSORS

(75) Inventors: Cyrus Bamji, Fremont, CA (US); Hakan Yalcin, Fremont, CA (US)

(73) Assignee: Canesta, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,086

(22) Filed: Dec. 30, 2008

(65) Prior Publication Data

US 2009/0115995 A1 May 7, 2009

Related U.S. Application Data

(63) Continuation of application No. 11/825,582, filed on Jul. 6, 2007, now Pat. No. 7,471,376.

(51) Int. Cl.
*G01C 3/08* (2006.01)

(52) U.S. Cl. ................... 356/5.1; 356/3.1; 356/4.1; 356/5.01

(58) Field of Classification Search ....... 356/3.01–3.15, 356/4.01–4.1, 5.01–5.15, 6–22
See application file for complete search history.

(56) References Cited

U.S. PATENT DOCUMENTS

| | | | | | |
|---|---|---|---|---|---|
| 5,082,364 | A | * | 1/1992 | Russell | 356/5.15 |
| 5,377,219 | A | * | 12/1994 | Geiger | 372/97 |
| 7,330,034 | B1 | * | 2/2008 | Pelletier et al. | 324/640 |

* cited by examiner

*Primary Examiner*—Thomas H Tarcza
*Assistant Examiner*—Luke D Ratcliffe
(74) *Attorney, Agent, or Firm*—Michael A. Kaufman, Esq.; Canesta, Inc.

(57) ABSTRACT

Rapid calibration of a TOF system uses a stationary target object and electrically introduces phase shift into the TOF system to emulate target object relocation. Relatively few parameters suffice to model a parameterized mathematical representation of the transfer function between measured phase and Z distance. The phase-vs-distance model is directly evaluated during actual run-time operation of the TOF system. Preferably modeling includes two components: electrical modeling of phase-vs-distance characteristics that depend upon electrical rather than geometric characteristics of the sensing system, and elliptical modeling that phase-vs-distance characteristics that depending upon geometric rather than electrical characteristics of the sensing system.

20 Claims, 14 Drawing Sheets

METHOD AND SYSTEM FOR FAST CALIBRATION OF THREE-DIMENSIONAL (3D) SENSORS

RELATION TO PENDING APPLICATION

Priority is claimed to U.S. patent application Ser. No. 11/825,582 filed 6 Jul. 2007 entitled "Method and System for Fast Calibration of Three-Dimensional (3D) Sensors", soon to issue as U.S. Pat. No. 7,471,376, which application claimed priority to provisional patent application Ser. No. 60/818,819 filed 6 Jul. 2006, entitled Method and System for Fast Calibration of Three-Dimensional (3D) Sensors.

BACKGROUND OF THE INVENTION

Three-dimensional (3D) cameras (or sensors) based on time-of-flight (TOF) principle acquire distance information from object(s) in a scene being imaged. Distance information is produced independently at each pixel of the camera's sensor. Exemplary such systems are described in U.S. Pat. No. 6,323,942 "CMOS-Compatible Three-Dimensional Image Sensor IC" (2001), and U.S. Pat. No. 6,515,740 "Methods for CMOS-Compatible Three-Dimensional Image Sensing Using Quantum Efficiency Modulation" 2003, which patents are assigned to Canesta, Inc., presently of Sunnyvale, Calif.

As described in U.S. Pat. No. 6,323,942, a TOF system emits optical energy and determines how long it takes until at least some of that energy reflected by a target object arrives back at the system to be detected. Emitted optical energy traversing to more distant surface regions of a target object before being reflected back toward the system will define a longer TOF than if the target object were closer to the system. If the roundtrip TOF time is denoted t1, then the distance between target object and the TOF system is Z1, where Z1=t1·C/2, where C is velocity of light. Such systems can acquire both luminosity date (signal amplitude) and TOF distance, and can realize three-dimensional images of a target object in real time.

A more sophisticated TOF system is described in U.S. Pat. No. 6,515,740, wherein TOF is determined by examining relative phase shift between transmitted light signals and light signals reflected from a target object. FIG. 1A depicts an exemplary phase-shift detection system 100 according to the '740 patent. Detection of the reflected light signals over multiple locations in the system pixel array results in measurement signals that are referred to as depth images. The depth images represent a three-dimensional image of the target object surface.

Referring to FIG. 1A, TOF system 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 may also include a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, a source of optical energy 120 is periodically energized via exciter 115, and emits optical energy via lens 125 toward an object target 20. Typically the optical energy is light, for example emitted by a laser diode, VCSEL (vertical-cavity surface emitting laser) or LED device 120. Some of the optical energy emitted from device 120 will be reflected off the surface of target object 20, and will pass through an aperture field stop and lens, collectively 135, and will fall upon two-dimensional array 130 of pixel detectors 140 where an image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined. Advantageously system 100 can be implemented on a single IC 110, without moving parts and with relatively few off-chip components.

Typically optical energy source 20 emits preferably low power (e.g., perhaps 1 W peak) periodic waveforms, producing optical energy emissions of known frequency (perhaps 30 MHz to a many hundred MHz) for a time period known as the shutter time (perhaps 10 ms). Optical energy from emitter 120 and detected optical energy signals within pixel detectors 140 are synchronous to each other such that phase difference and thus distance Z can be measured for each pixel detector. The detection method used is referred to as homodyne detection in the '740 and '496 patents. Phase-based homodyne detection TOF systems are also described in U.S. Pat. No. 6,906,793, Methods and Devices for Charge Management for Three-Dimensional Sensing, assigned to Canesta, Inc., assignee herein.

The optical energy detected by the two-dimensional imaging sensor array 130 will include light source amplitude or intensity information, denoted as "A", as well as phase shift information, denoted as $\phi$. As depicted in exemplary waveforms in FIGS. 1B and 1C, the received phase shift information (FIG. 1C) varies with TOF and can be processed to yield Z data. For each pulse train of optical energy transmitted by emitter 120, a three-dimensional image of the visible portion of target object 20 is acquired, from which intensity and Z data is obtained (DATA). As described in U.S. Pat. Nos. 6,515,740 and 6,580,496 obtaining depth information Z requires acquiring at least two samples of the target object (or scene) 20 with 90° phase shift between emitted optical energy and the pixel detected signals. While two samples is a minimum figure, preferably four samples, 90° apart in phase, are acquired to permit detection error reduction due to mismatches in pixel detector performance, mismatches in associated electronic implementations, and other errors. On a per pixel detector basis, the measured four sample data are combined to produce actual Z depth information data. Further details as to implementation of various embodiments of phase shift systems may be found in U.S. Pat. Nos. 6,515,740 and 6,580,496.

FIG. 1D is similar to what is described with respect to the fixed phase delay embodiment of FIG. 10 in U.S. Pat. No. 6,580,496, entitled Systems for CMOS-Compatible Three-Dimensional Image Sensing Using Quantum Efficiency Modulation, or in U.S. Pat. No. 7,906,793, entitled Methods and Devices for Charge Management for Three-Dimensional Sensing, both patents assigned to Canesta, Inc., assignee herein. In FIG. 1D, generated photocurrent from each quantum efficiency modulated differential pixel detector, e.g., 140-1, is differentially detected (DIF. DETECT) and differentially amplified (AMP) to yield signals $B \cdot \cos(\phi)$, $B \cdot \sin(\phi)$, where B is a brightness coefficient.

During normal run-time operation of the TOF system, a fixed 0° or 90° phase shift delay (DELAY) is switchably insertable responsive to a phase select control signal (PHASE SELECT). Homodyne mixing occurs using quantum efficiency modulation to derive phase difference between transmitted and received signals (see FIGS. 1B, 1C), and to derive TOF, among other data. A more detailed description of homodyne detection in phase-based TOF systems is found in the '496 patent. Although sinusoidal type periodic waveforms are indicated in FIG. 1D, non-sinusoidal waveforms may instead be used. As described later herein, the detection circuitry of FIG. 1D may be used with embodiments of the present invention.

In many applications it is advantageous to have geometric information as such information makes it easier to perceive and interact with the real world. As noted, three-dimensional TOF camera systems including exemplary system 100 in FIG. 1A accomplish this task using a modulated light source 120 (e.g., an LED, a laser, a VCSEL, etc.) to illuminate a scene containing a target object 20. The light reflected from the scene is processed in the camera's sensor pixels to determine the phase delay ($\phi$) between the transmitted light and reflected light. Phase delay (or simply phase herein) is proportional to the (Z) distance between the sensor and the target. However phase delay is a relative quantity and is not per se equal to Z distance. For example as Z increases, phase $\phi$ increases, but after an increase of 360°, the phase folds-over and further increases in Z will produce further increases in $\phi$, again starting from 0°. It is thus necessary to disambiguate or de-alias the phase data to obtain a true measure of Z.

Furthermore, the sensor's pixels measure phase delay along a certain radial angle that is different for each pixel 140 in array 130. However many applications prefer using Cartesian (or real world X,Y,Z) coordinates instead of radial information. A mechanism is needed to establish correspondence or mapping between phase and real world coordinates. Such a mechanism is obtained through a calibration process.

Thus, one function of calibration may be defined as creating a mapping from the sensor 140 response to geometrical coordinates, which are X, Y, and Z information with respect to a known reference. As used herein, X and Y coordinates are the horizontal and vertical offsets from the optical axis of the system, and Z is the perpendicular distance between the sensor and the target object (e.g., object in a scene). Typically the calibration process includes several steps, where each step creates one kind of mapping. For instance, the mapping for real-world Z coordinates is done by a step called Z (distance or depth) calibration, while the mapping for real-world X,Y coordinates is done by another step called XY calibration.

In addition to geometrical calibration, one must perform other types of calibration to account for certain environmental factors, including without limitation temperature and ambient lighting conditions. For example, temperature changes in sensor array 130 can increase so-called dark current in pixels 140, which dark current can in turn change measured phase $\phi$. Ambient light can interfere with system-emitted light from source 120, and can result in phase errors. A complete calibration procedure preferably will include steps to model the effects of such environmental changes. So doing can allow these effects to be removed dynamically during run-time operation, when the environmental conditions may change.

Consider for example distance (Z) calibration techniques, according to the prior art. One known calibration method for a three-dimensional system captures sensor phase response for a number of known Z distance values as the target object is successively moved or relocated in the XY plane. This prior art calibration method will be referred to herein as the "by-example" method. Using this method sensor data from array 130 are captured for each target object location and stored in memory. The resultant phase-vs.-distance curve is constructed as a calibration table of sensor response-distance pairs that is sampled at several values of distance. During actual run-time operation of the TOF system so calibrated, perhaps system 100, the stored calibration table data is interpolated and bracketed to determine Z distance for a given sensor phase response. Thus, a given phase response from the sensor array is converted to distance by interpolating the values stored in the calibration table. However the phase-vs-distance transfer function curve contains harmonics and sufficient data points must be stored in the calibration table to model these harmonics to avoid loss of accuracy due to insufficient sampling. There is also interpolation error that can only be reduced by increasing the size of the table.

Although the "by-example" method is straightforward to implement with relatively fast run-time processing, it has several disadvantages. Taking a subset of the operating range and subsequent interpolation results in errors that can be several cm in magnitude. Further, as the operating range of the sensor is increased, more data must be stored in the calibration table to maintain accuracy. This generates larger calibration tables, requiring more storage, as well as longer interpolation times. Storage can be on the order of several MB, e.g., very large for use with embedded systems. Another problem from a practical standpoint is the large physical space needed to capture data from the sensor for large field of view (FOV) and operating ranges as the target object is repositioned. For example, a sensor with a 100° FOV and 5 m operating range requires a target object of approximately 12 m×12 m, which target object must be moved between 0 and 5 m during calibration. Given enough physical space for target object relocation during calibration, and given enough time for the calibration procedure, such prior art "by example" calibration can be carried out. But such prior art calibration procedure has high costs and is not very suitable for calibrating a high-volume product.

What is needed are more efficient methods and systems to implement detected phase to distance calibration for three-dimensional camera systems. Such methods and systems should require less time and smaller physical space to be carried out, and the calibration data should require less space for storage for use during system run-time operation. Preferably such calibration should provide a first model that depends upon electrical rather than physical characteristics of the sensors in the system under calibration, and should provide a second model that depends upon physical rather than electrical characteristics of the sensors.

The present invention provides such methods and systems.

DESCRIPTION OF THE PRESENT INVENTION

Rather than acquire calibration data for a TOF system by relocating a target object over a large physical space, embodiments of the present invention calibrate by introducing electrical phase offset into a TOF system to emulate relocation of a stationary target object. As the introduced phase shift is swept in phase, detection samples are acquired from the TOF system. This process takes a relatively short time, and does not require mechanical repositioning of the target object, or of the detector sensor array relative to the target object.

The acquired data when converted to a model requires relatively small memory storage, perhaps 20% of the storage requirements for prior art "by example" calibration data. The acquired data is used to construct a preferably parameterized calibration phase-vs-distance model of the TOF system, which model requires substantially less storage space than does the acquired data. Once the model is constructed, the acquired data may be discarded and the relatively compact data for the model stored. Using curve fitting, parameters are preferably determined that fit the acquired data to a predetermined analytical model of the distance-vs-phase transfer function for the TOF system. During actual run-time of the TOF system, the stored model is evaluated, rather than interpolated.

Model accuracy is enhanced preferably by taking into account electrical and physical characteristics of the TOF system under calibration. More specifically, an electrical model represents distance-vs-phase characteristics of the TOF system that are substantially independent of physical geometry. An elliptical model takes into account geometrical characteristics that are substantially independent of electrical characteristics. The elliptical model advantageously reduces so-called elliptical error that becomes increasing important for small distances Z, where differences in path length from TOF light source to target object, and TOF sensor array to target object are not negligible.

Other features and advantages of the invention will appear from the following description in which the preferred embodiments have been set forth in detail, in conjunction with their accompanying drawings.

DETAILED DESCRIPTION OF THE PREFERRED EMBODIMENT

In brief, prior art "by example" calibration techniques require repositioning a target object relative to a TOF system and recording data. During run-time of the TOF system, the recorded data is interpolated to provide calibration between phase and distance. By contrast, the present invention calibrates using a stationary target object and electrically introduces phase shift into the TOF system to emulate relocation of the target object. The relatively few data samples thus taken are used to build a model that preferably is a parameterized mathematical representation of the general form x+sin(x). The phase-vs-distance model data is stored as a look-up table that is evaluated (rather than interpolated) during actual run-time operation of the TOF system. The acquired data may be purged once the model data has been stored. Advantageously calibration according to the present invention takes less time to perform, perhaps minutes contrasted with tens of minutes using prior art "by example" calibration. Further, calibration according to the present invention requires less physical space since there is no need to repeatedly reposition the target object. In addition, the resultant model data is quite compact, typically requiring a few hundred KB of storage, as contrasted with several MB of storage for data acquired using prior art "by example" calibration.

Modeling according to the present invention preferably includes two components: (1) electrical modeling of phase-vs-distance characteristics that depend upon electrical rather than geometric characteristics of the sensing system, and (2) elliptical modeling of phase-vs-distance characteristics that depend upon geometric rather than electrical characteristics of the sensing system.

Figure 1A:
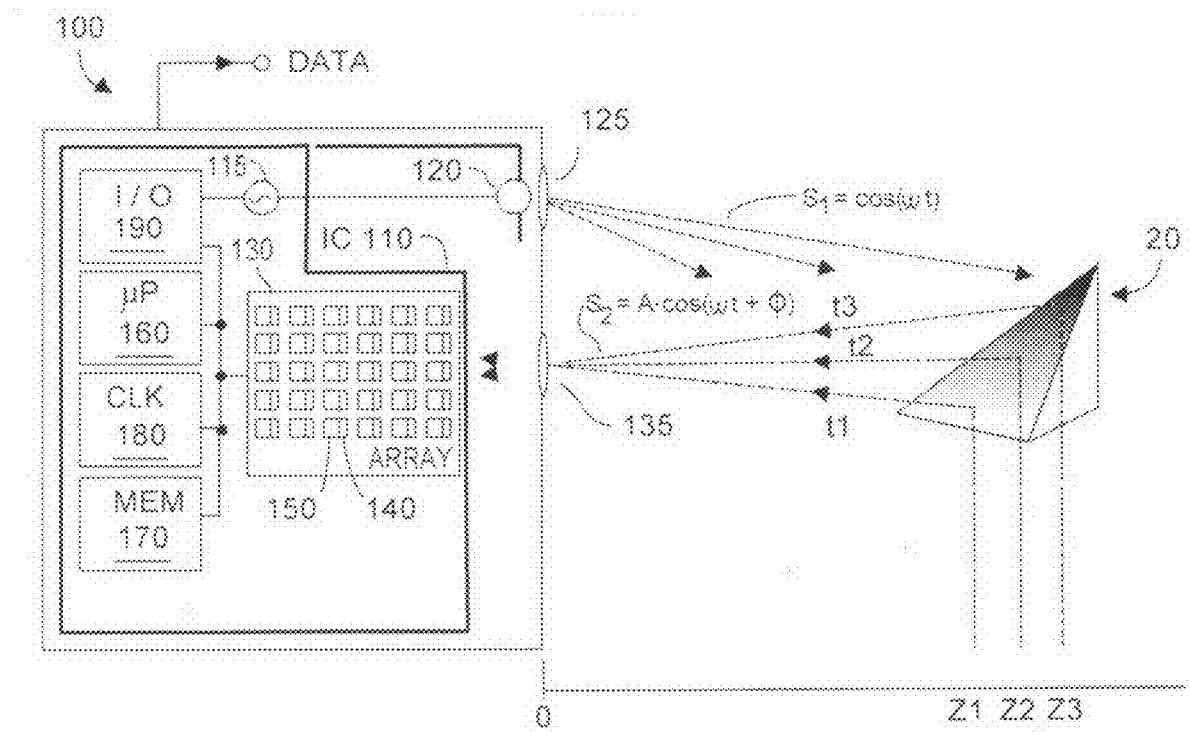
FIG. 1A is a block diagram depicting a phase-phased, three-dimensional time-of-flight imaging system as exemplified by U.S. Pat. No. 6,515,740, according to the prior art.
Figure 1B:
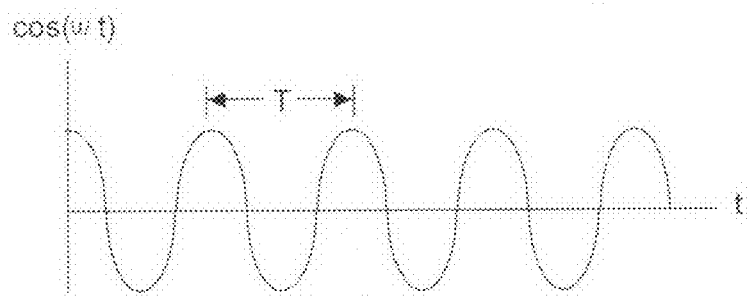
FIGS. 1B and 1C depict exemplary waveform relationships for the block diagram of FIG. 1A, according to the prior art.
Figure 1C:
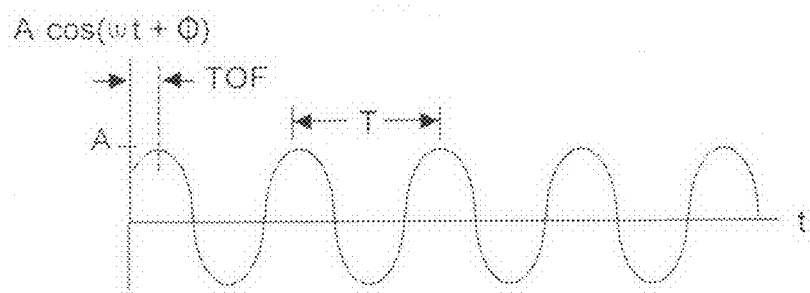
Figure 2:
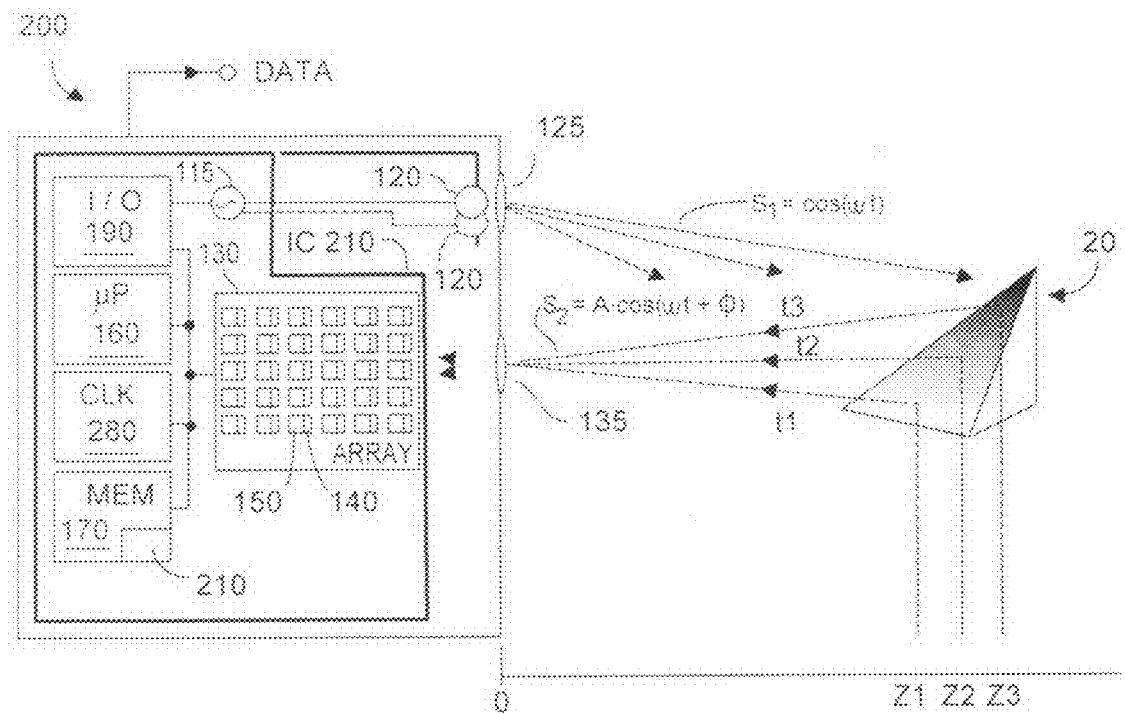
FIG. 2 depicts a TOF system, calibrated and including a calibration look-up table, according to an embodiment of the present invention.

FIG. 2 depicts a TOF system 200 whose memory 170 stores, among other data, a calibration look-up table 210, obtained in calibration mode, according to an embodiment of the present invention. Elements within system 200 that bear reference numerals identical to those of TOF system 100 (FIG. 1A) may in fact be identical elements. In some embodiments of the present invention, multiple light emitters 120 may be used, as indicated in phantom in FIG. 2. As described herein, data within look-up table 210 typically require but a few hundred KB of storage, and as such look-up table 210 may readily be incorporated into embedded systems. During calibration mode, system 200 clock generator circuitry 280 generates a calibration phase timing signal such that detector array 130 believes target object 20 disposed at distance Z is located other than distance Z. As will be described, the present invention recognizes that introducing an electrical phase change into system 200 is equivalent to physically relocating the target object 20.

Figure 1D:
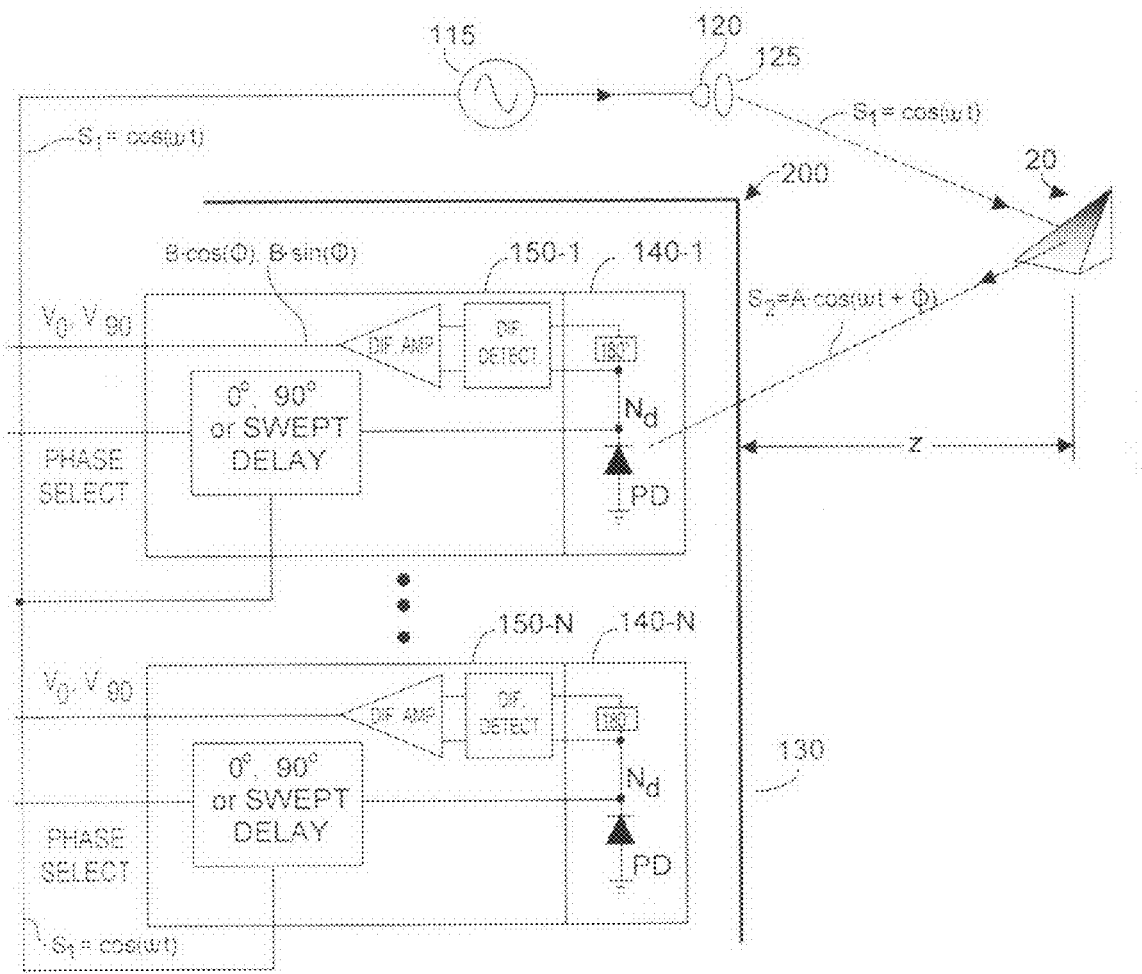
FIG. 1D is a block diagram depicting exemplary differential photodetectors and associated electronics in a fixed-phase delay (FPD) quantum efficiency modulated detector, such as may be used with the present invention.

Referring briefly to FIG. 1D, if such detection circuitry is included in TOF system 200, during calibration mode according to the present invention, the DELAY elements preferably are commanded to insert a swept phase delay over a range preferably encompassing 0° to 360°. The phase sweep can be continuous but preferably is in discrete increments, perhaps 10°. Granularity of the sweep preferably is determined by several factors including hardware implementing and present operating frequency of the TOF clock generator 280, anticipated normal Z range for TOF system 200, etc.

Figure 3A:
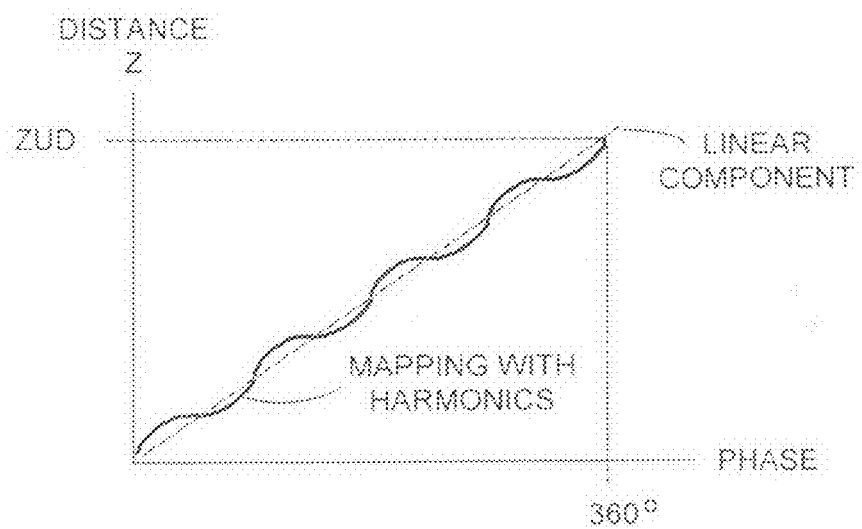
FIG. 3A depicts distance-vs.-phase mapping characteristics, showing the presence of harmonic components in addition to a linear component, according to an embodiment of the present invention.

As will now be described, aspects of calibration according to the present invention capture the fundamental electronic detection characteristics of system 200, as well as geometry-related detection characteristics, e.g., so-called elliptical error. Fast-Z calibration preferably creates a phase-to-distance mapping with as few data points as possible, in a time-efficient and space efficient manner. To capture the fundamental electronic detection characteristics of system 200, the phase-vs-distance mapping should ideally be linear but include harmonics, as shown in FIG. 3A. Further, for Z distances that are small, the physical separation between the sensor detectors 140 and light emitter(s) 120 give rise to an elliptical error that should be modeled to ensure accurate calibration.

FIG. 3A depicts the phase-vs.-distance detection relationship for a TOF sensor system such as system 100 or system 200 and demonstrates that the transfer function has a linear component as well as sinusoidal terms that represent harmonic content. This relationship arises from the electrical characteristics of sensor structure 140 and circuitry 150 and indeed array 130, and from imperfections (higher order terms) of the light waveform from emitter(s) 120. The distance-vs.-phase mapping of FIG. 3A is an electrical modeling that is substantially independent of the physical configuration of the sensor array 130 and the modulated light source 120. As described later herein, the distance-vs-phase representation of FIG. 3A may be characterized by a parametric expression, for example, radial distance is proportional to $p+k_1 \sin(k_2\pi+2\pi p)$, where p represents phase, and $k_1$ and $k_2$ are system parameters. For example, $k_1$ also models individual pixel detector response and behavior to reflected light from emitter(s) 120. In the above representation for radial distance, proportionality, rather than equality, is used to accommodate different distance units. As described later herein, the present invention also models the physical characteristics of the sensing system that are substantially independent of electrical characteristics. This second modeling accounts for so-called elliptical error, arising from different path lengths from emitter(s) 120 to target object 20, and from target object 20 to sensor detectors 140 in detector array 130. At relatively short distances Z, elliptical error increases in magnitude because the above-defined path lengths can differ substantially.

Figure 3B:
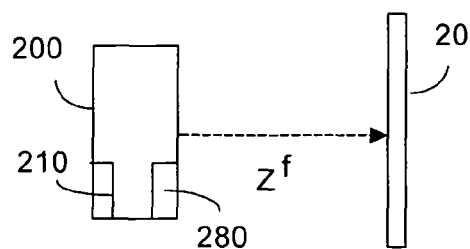
FIG. 3B depicts a TOF system during swept phase calibration mode, according to an embodiment of the present invention.
Figure 8A:
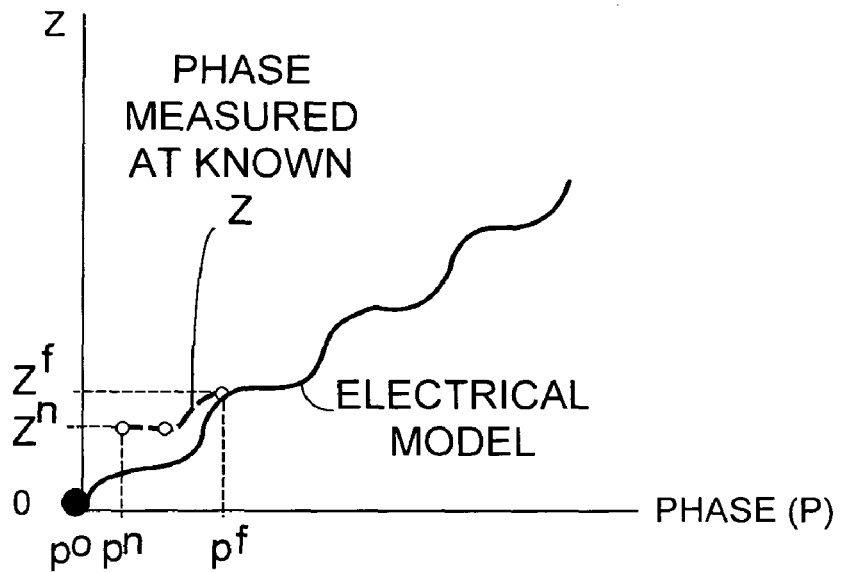
FIG. 8A depicts data points from the electrical model and from actual measured phase at common distances $Z^n$ and $Z^f$ used for elliptical error determination, according to an embodiment of the present invention.
Figure 8B:
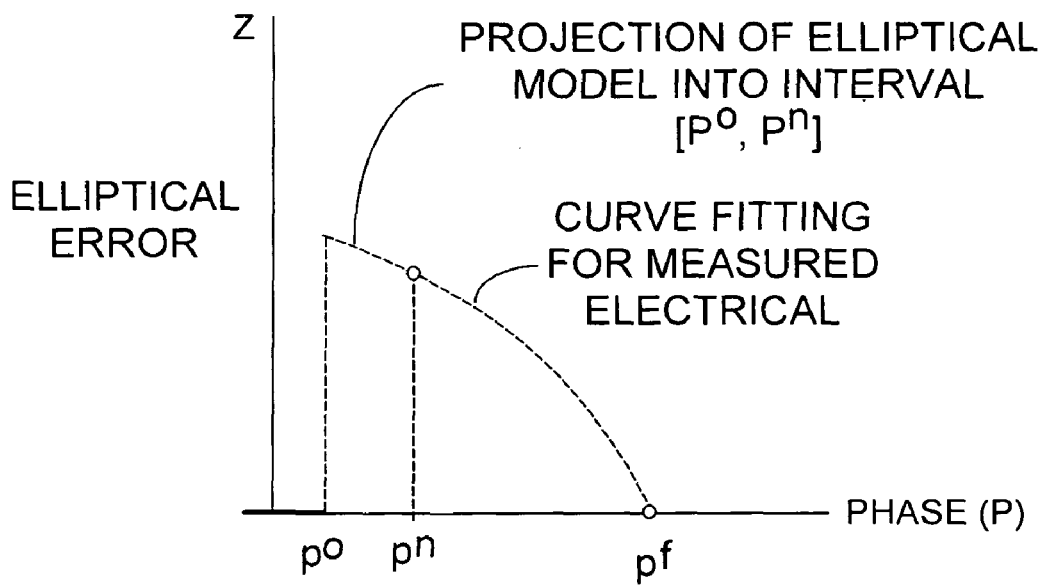
FIG. 8B depicts an elliptical error model determined from the difference of the two curves depicted in FIG. 8A, according to an embodiment of the present invention.

As depicted in FIG. 3B during calibration mode, phase-vs-distance calibration data are acquired according to the present invention using a stationary target object 20, shown disposed a fixed distance $Z^f$ from the TOF system 200 under calibration. As described later herein, $Z^f$ preferably is the smallest distance at which the elliptical error becomes sufficiently small to be ignored. In practice, when system 200 (or the like) is being mass produced, $Z^f$ will previously have been empirically determined for this system type. Perhaps $Z^f$ will have been determined to be 80 cm. For each system 200 that is mass produced, target object 20 is disposed distance $Z^f$ away, and data is acquired to build an electrical model. Building and storing the electrical model typically takes but a minute or so, and requires perhaps a few hundred KB of memory storage for the model. By definition, phase error at distance $Z^f$ is acceptable small, as will be phase error for $Z>Z^f$. But data acquired for $Z<Z^f$ will contain geometric-type elliptical error, and thus an elliptical error model is next constructed. As will be described with respect to FIGS. 8A and 8B, it is sufficient to acquire phase data for a few points at distances less than $Z^f$, perhaps at 60 cm, and 40 cm, where for a given model of system 200, $Z^f$ is about 80 cm. Using these relatively few points, elliptical error is modeled, as shown in FIGS. 8A and 8B. With elliptical error compensation, phase data for $Z<Z^f$ will be acceptable data.

Figure 3C:
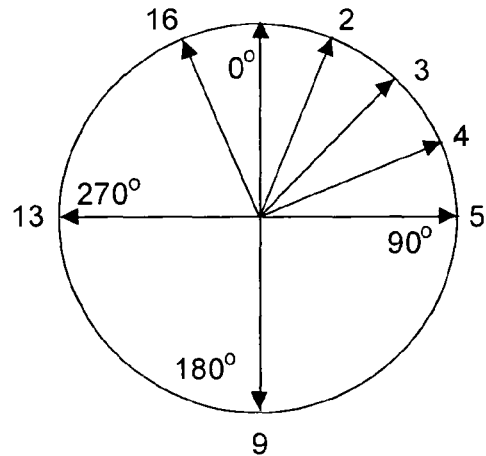
FIG. 3C is a schematic representation of phase sweeping during calibration mode, according to an embodiment of the present invention.

As shown by FIG. 3C, during calibration mode, clock unit 280 injects a sweep of phase shift offsets through a full 360° into TOF system 200. As a result, exciter 115 causes the light waveforms emitted by light source(s) 120 to exhibit swept phase shift. For ease of illustration and comprehension, FIG. 1D depicts the shift-in-phase as associated within pixels 140 in detector array 130. However the shift in phase will be common to all pixel detectors 140. Thus it may be more economical to implement phase shifting within the light source path, e.g., via exciter 115. In any event, it is understood that the configuration of FIG. 1D is intended to be exemplary with respect to the mechanics of phase shifting, and other configurations are possible. A number of discrete sweep phase shifts is shown in FIG. 3C, while FIG. 3D depicts the resultant phase-vs-distance transfer function for an exemplary pixel 140 in detector array 130, and models the electrical detection characteristics that are substantially independent of physical geometry.

Figure 3D:
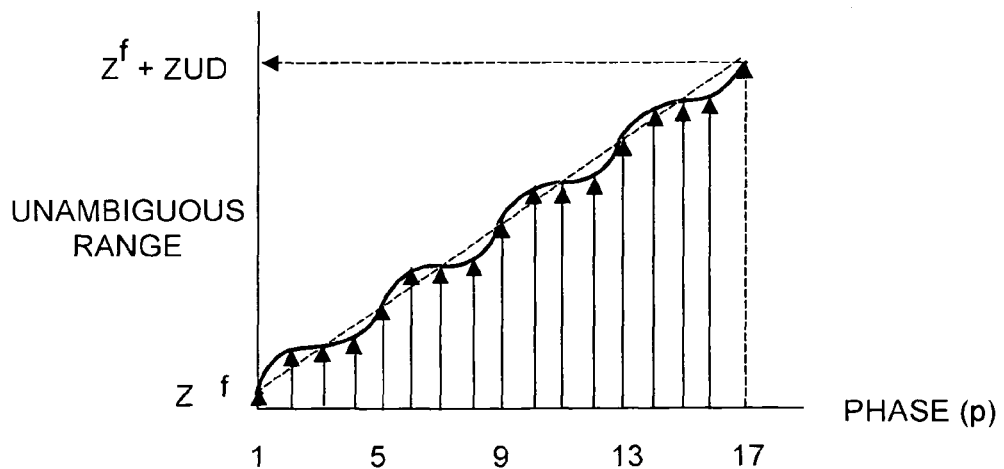
FIG. 3D depicts distance-vs-phase data acquired during the phase sweep depicted in FIG. 3C, according to an embodiment of the present invention.

With reference to FIG. 3A and FIG. 3D, as phase of the emitted light signal from emitter(s) 120 is swept from 0° to 360°, the effect upon TOF system 200 is tantamount to a relocation of target object 20 through a full unambiguous detection operating range (ZUD), perhaps 3 m for a 50 MHz clock generator signal, 1.5 m for a 100 MHz clock generator signal, etc.

Sweeping of the emitted light phase as indicated in FIG. 3C preferably is implemented by clock generator block 280 fabricated on IC chip, 210, upon which much of system 200 may be fabricated, and by exciter 115, which typically is implemented off-chip. Preferably a different configuration is loaded into clock-generator block 280 and thus exciter 115 has a different phase each time and therefore the phase of light from emitter 120 is changed. Typically block 280 includes or is driven by a high-speed clock operating at perhaps 1 GHz clock frequency. Preferably clock-generator block 280 can produce a minimum phase shift of approximately 10° increments, which is sufficient to sample the distance-phase curve for a distance accuracy of about 1 cm to 2 cm. Once the data is taken from sensor detector array 130, the desired analytic model of distance-vs-phase can be generated.

Figure 3E:
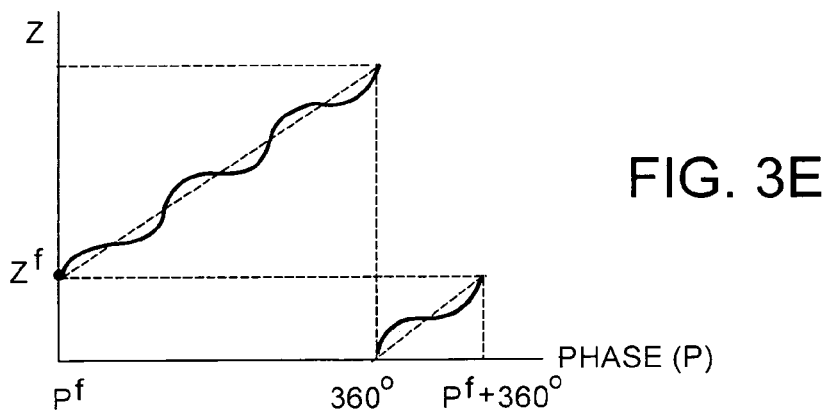
FIG. 3E depicts distance-vs-phase data acquired during a phase sweep, according to an embodiment of the present invention.
Figure 3F:
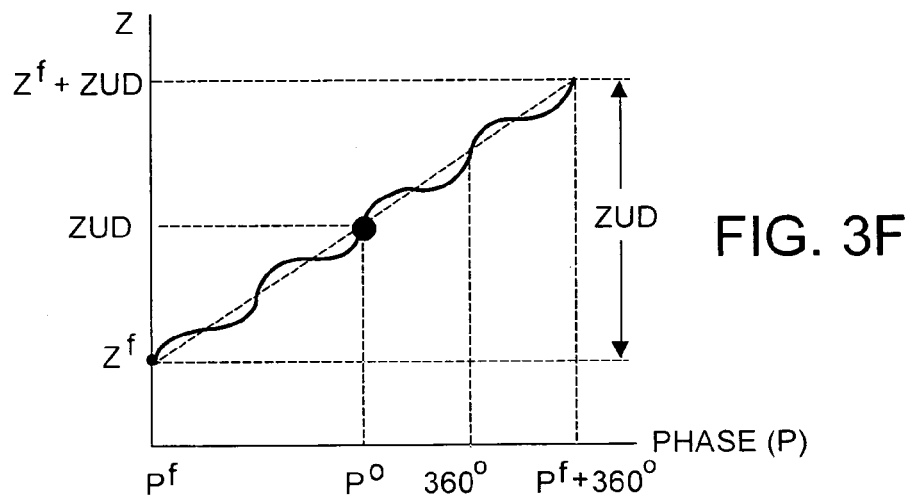
FIG. 3F depicts phase unwrapping of the data depicted in FIG. 3E, to avoid distance ambiguity or aliasing in modeling, according to an embodiment of the present invention.

As shown by FIGS. 3E and 3F, it is desired that the distance-vs-phase model be unambiguous for phase changes within a 360° sweep, which is to say the Z values should be free of aliasing. So doing preferably involves unwrapping the transfer function data for p>360°. In FIG. 3F, the notation $P^f$ denotes phase shift at distance $Z^f$, and the notation ZUD denotes unambiguous Z distance, even when phase p>360°. This result is achieved by upshifting by $Z^f$ distance data for p>360°. In FIG. 3F, the resultant transfer function is unwrapped and unambiguous for distances $Z^f$.

Figure 3G:
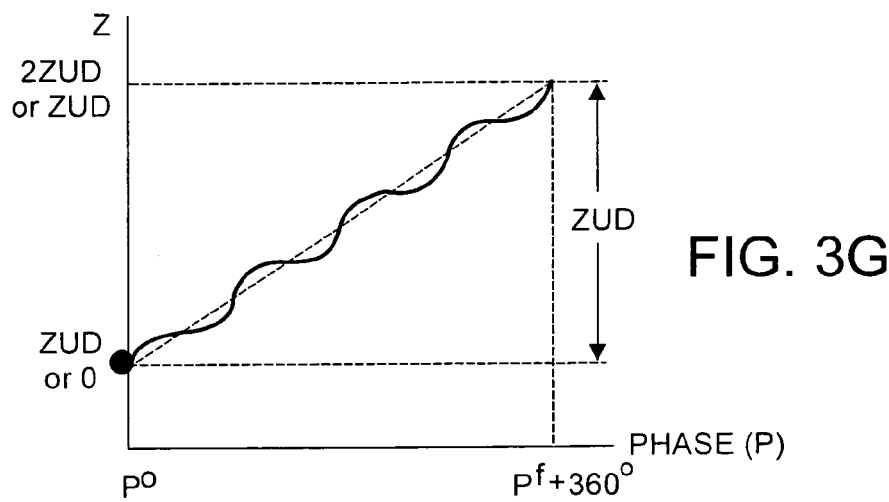
FIG. 3G depicts translation of data point $p^0$ in FIG. 3F, to the vertical axis of FIG. 3G such that all data angles in the constructed model are preferably referenced to 0°, according to an embodiment of the present invention.

In FIG. 3G, the data point for $p^0$ is translated from ZUD to 0 (or ZUD), on the Z vertical axis, which optional translation advantageously assists in data dealiasing for long range applications where the target may be at an interval greater than the ZUD. Preferably the electrical model data depicted in FIG. 3F is next normalized such that $p=(\text{phase}-P^0)/360°$ and $z=Z/ZUD$, while still ensuring the phase does not wrap around. Thus, FIG. 3G depicts the data of FIG. 3F transformed into FIG. 3G and thus so normalized, this transformation operation is optional.

Understandably it is important to identify a suitable analytic model to accurately and succinctly describe the distance-vs-phase transfer function relationship. One method to identify such a model is to collect data from many three-dimensional camera systems of the same kind, i.e., camera systems having the same physical, electrical and optical characteristics. By analyzing the common properties of this data, one can construct a parameterized function that captures the fundamental behavior of the camera system, perhaps system 100 or 200, and also fits the data well.

The calibration described herein was found to be highly effective for TOF three-dimensional camera systems such as those designed by Canesta, Inc. of Sunnyvale, Calif., assignee herein. Various aspects of these TOF systems are described in various US patents assigned to Canesta, Inc., including U.S. Pat. No. 7,176,438 Method and System to Differentially Enhance Sensor Dynamic Range Using Enhanced Common Mode Reset, U.S. Pat. No. 7,157,685 Method and System to Enhance Differential Dynamic Range and Signal/Noise in CMOS Range Finding Systems Using Differential Sensors, U.S. Pat. No. 6,919,549 Method and System to Differentially Enhance Sensor Dynamic Range, U.S. Pat. No. 6,906,793 Methods and Devices for Charge Management for Three-Dimensional Sensing, U.S. Pat. No. 6,587,186 CMOS-Compatible Three-Dimensional Image Sensing Using Reduced Peak Energy, U.S. Pat. No. 6,580,496 Systems for CMOS-Compatible Three-Dimensional Image Sensing Using Quantum Efficiency Modulation, and U.S. Pat. No. 6,515,740 Methods for CMOS-Compatible Three-Dimensional Image Sensing Using Quantum Efficiency Modulation.

The calibration model successfully used for such TOF camera systems is defined by equation (1):

$$R = p + k_1 \sin(k_2 \pi + 2\pi p) \quad (1)$$

where R is the radial distance rather than the Z distance to the target object from the sensor array, p is the phase measured by the sensor system as the modulating light source from emitter 120 is swept in phase from 0° to 360°, and $k_1$ and $k_2$ are parameters obtained through curve fitting. Various curve fitting techniques available in the literature may be used to determine $k_1$ and $k_2$, for example LMS.

Figure 3H:
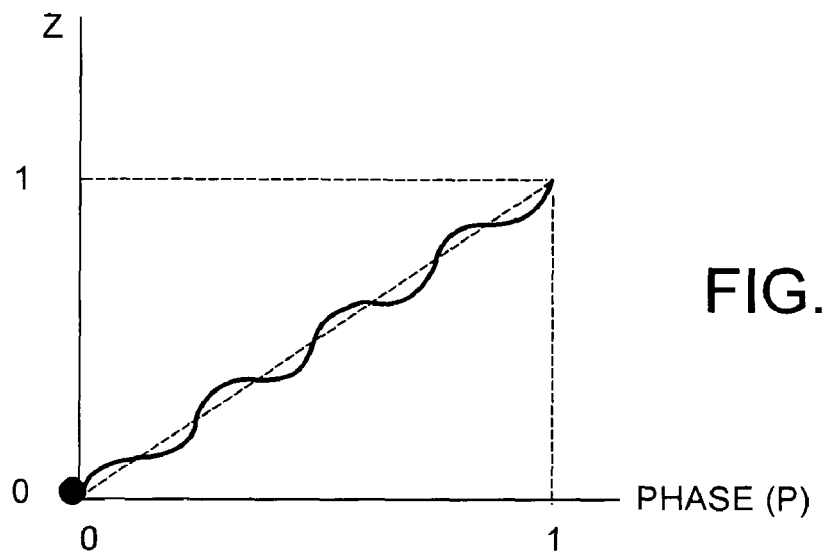
FIG. 3H depicts normalization of phase data depicted in FIG. 3F, according to an embodiment of the present invention.

Thus with respect to the normalized distance-vs-phase transfer function shown in FIG. 3H, curve fitting may begin with the representation:

$$Z = p + m_{ij} + A_{ij} \sin(s_{ij} p + 2\pi f p) \quad (2)$$

where $m_{ij}$ is a per pixel detector (140) DC parameter, $A_{ij}$ is a sinewave amplitude per pixel detector (140) parameter, $s_{ij}$ is a sinewave phase shift per pixel detector (140) parameter, f is a global parameter, e.g., f=4, and where it is understood that $P_{0ij}$ is phase at $Z^f$.

Given equation (2), actual Z may be obtained by multiplying z·ZUD, as follows, where $ZUD_{ij}$ is a per pixel parameter representing unambiguous Z range.

$$Z = ZUD_{ij} \cdot [p + m_{ij} + A_{ij} \sin(s_{ij} p + 2\pi f p)] \quad (3)$$

Figure 3I:
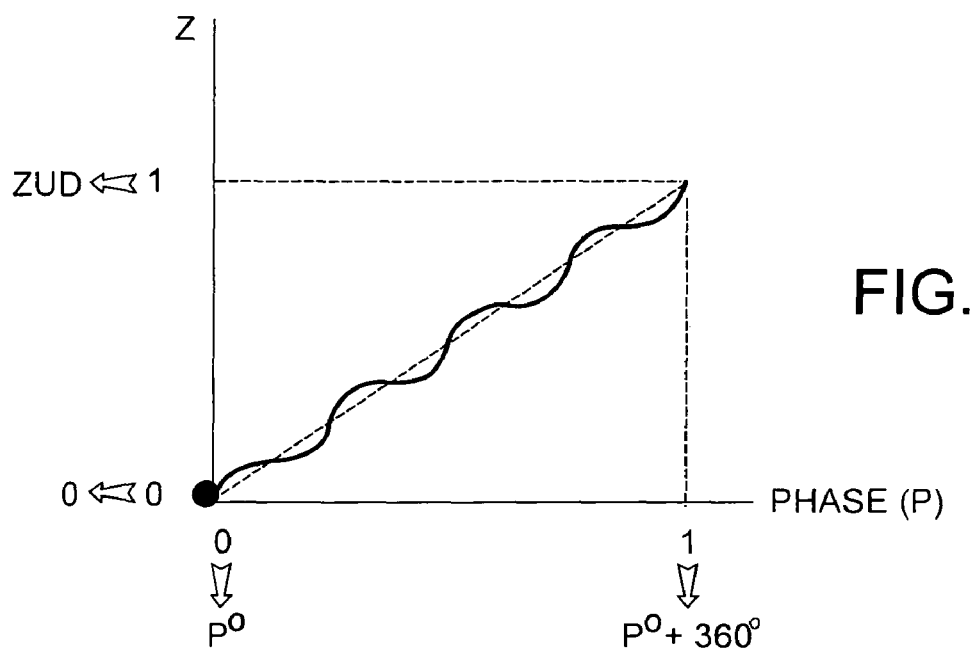
FIG. 3I depicts the normalized phase data of FIG. 3H converted to actual Z value, according to an embodiment of the present invention.

The result of such conversion is shown in FIG. 3I, wherein normalized phase $p=(\text{phase}-P^0)/360°$, and $m_{ij}, A_{ij}, s_{ij}, ZUD_{ij}$ are system parameters.

As noted, distance R calculated by equation (1) is the radial distance between sensors 140 in array 130 and target object 20, and not the Z distance. While a phase change is equivalent to moving the target object, this is true along the viewing axis of each pixel detector 140 in array 130. Stated differently, a phase change implies moving the target object along the radial (R) axis, and not along the Z axis. As noted above, since calibration should yield Z information, radial distances R have to be converted to Z. The relationship between R and Z is depicted in FIG. 4.

Figure 4:
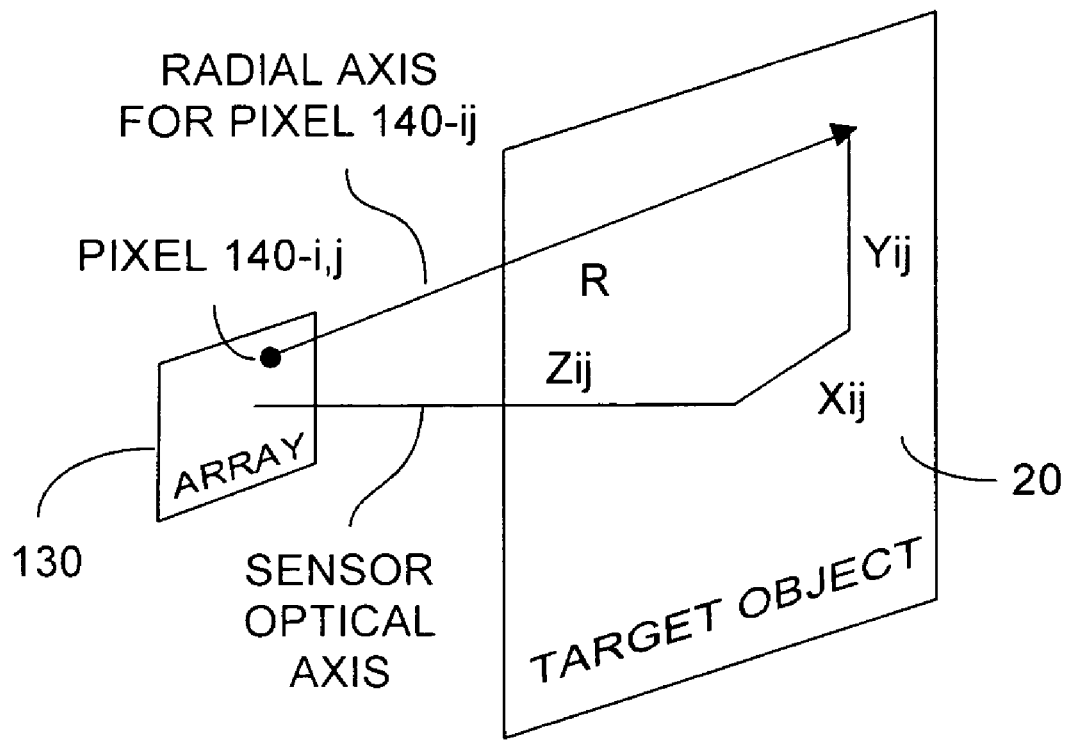
FIG. 4 depicts system nomenclature used to transform XY calibration data to $ZUD_{ij}$ information, according to an embodiment of the present invention.

As seen in FIG. 4, one can obtain the Z distance from equation (4):

$$Z = R / \sqrt{1 + (Xij^2 + Yij^2)/Zij^2} \quad (4)$$

In equation (4), $X_{ij}, Y_{ij}, Z_{ij}$ are the geometric coordinates of the area imaged by pixel 140-(i,j) with respect to the plane of sensor array 130 (see FIG. 2), and the optical axis. $X_{ij}, Y_{ij}$ are determined by a previous XY calibration performed at a known (and fixed) distance $Z_{ij}$. It follows from equation (4) that:

$$ZUDij = UD / \sqrt{1 + (Xij^2 + Yij^2)/Zij^2} \quad (5)$$

where $ZUD_{ij}$ differs for each pixel detector 140 in array 130, and is determined from XY calibration.

Methods for XY calibration are known in the art. For example, one known method places a flat target having a sinusoidal pattern specially made for XY calibration at distance $Z_{ij}$ from the sensor (typically 1 m). From the brightness images of this target, one can calculate $X_{ij}$ and $Y_{ij}$ locations of the area imaged by each pixel of the sensor array. The $X_{ij}, Y_{ij}, Z_{ij}$ information is then stored in a separate table, e.g., within memory 210, and subsequently used at run-time to produce X and Y locations of the target area imaged by pixel 140-(i,j).

The results of XY calibration are also used to convert R distances to Z, per equation (4). Hence the Z-distance vs. phase relationship can be expressed analytically using the data from the phase sweep and XY calibration, all without having to move target object 20.

Understandably, for accurate Z information, accurate XY calibration is required. For a Z accuracy of 1 cm, XY calibration should be well below 1 cm, and preferably only a few mm. Greater accuracy is needed for pixels near the edge of sensor array 130 since their viewing angle is greater (and hence more sensitive). The error due to inaccuracies in XY calibration grows with distance, and preferably calibration accuracy is checked at the far end of the operating range.

Figure 5A:
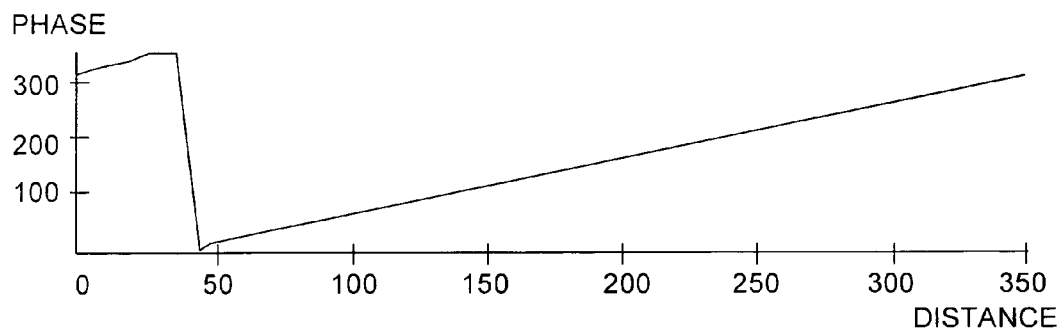
FIG. 5A depicts actual phase function data acquired for a single pixel in array 130, according to an embodiment of the present invention.
Figure 5B:
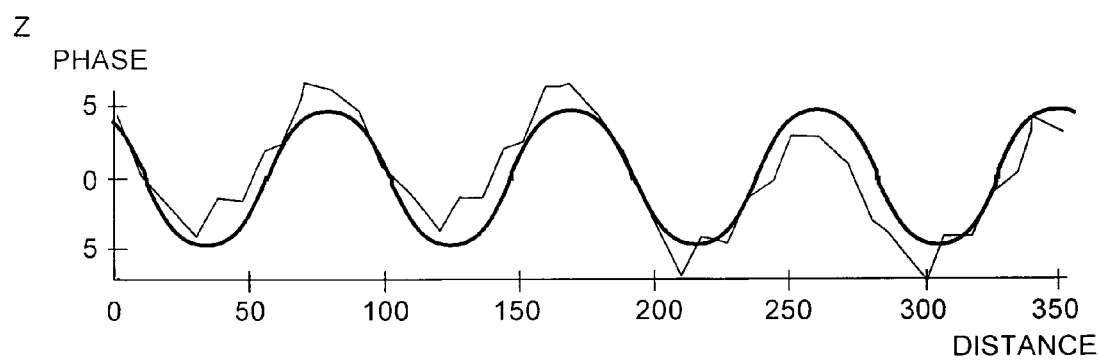
FIG. 5B depicts a parametric harmonic sine modeling term for the single pixel whose data is shown in FIG. 5A as well as a true sinewave term, according to an embodiment of the present invention.
Figure 5C:
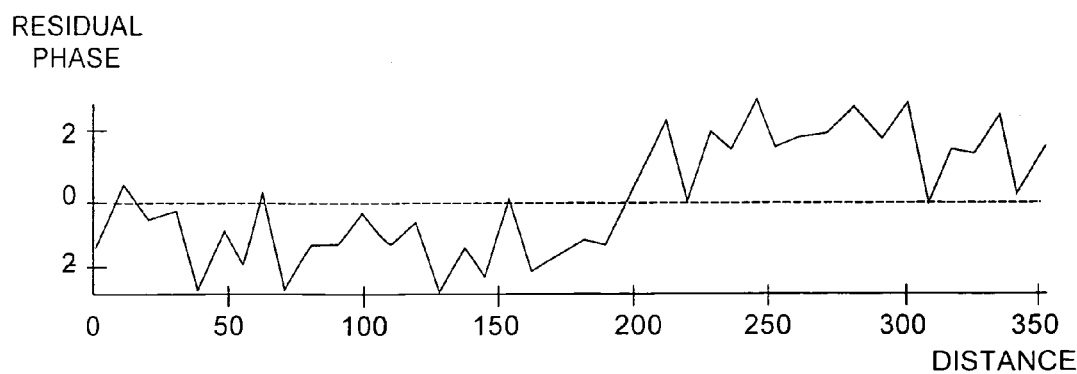
FIG. 5C depicts residual error resulting from the difference between the two waveforms shown in FIG. 5B, according to an embodiment of the present invention.

Before describing elliptical correction, it is useful to view actual data acquired from a pixel detector in an actual sensor array 130. FIG. 5A depicts measured phase-vs-distance measurements for an actual pixel 140 in an array 130 comprising 132 rows and 176 columns of pixel detectors. FIG. 5A depicts a response over a full phase sweep. The undulatory aspect of the response is too small to be discernable in FIG. 5, which is why the response appears substantially linear. FIG. 5B depicts the parametric harmonic model as well as a true sinewave, in an attempt to model the phase-vs-distance response of the pixel whose data is shown in FIG. 5A. More specifically, FIG. 5B depicts phase vs. residual phase after removal of the linear term, and a superimposed modeled sinewave term. FIG. 5C depicts the residual phase, which is the difference between the two curves plotted in FIG. 5B.

Having described electrical Z-calibration, in which no target object repositioning is required, elliptical correction according to the present invention will now be described. In the above-described electrical calibration method, it was assumed that no distance-dependent behavior or "irregularity" existed in the distance-phase relationship. However, in practice, this assumption is not justified. There will be irregularity in the distance-phase curve due to the physical separation between light emitter(s) 120 and array 130 of sensors 140. This physical separation is denoted in FIG. 6A, and results in light rays reflected from target object 20 back to the sensor having a different travel time relative to the travel time of light emitted from source(s) and striking the target 120.

Figure 6A:
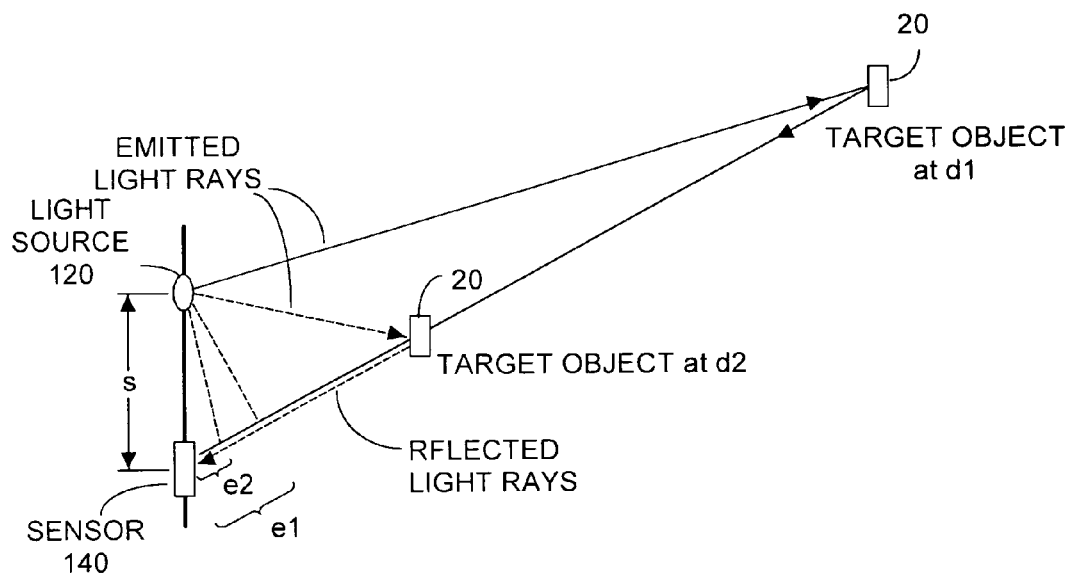
FIG. 6A depicts sensor geometry associated with modeling for elliptical error, according to an embodiment of the present invention.

At large values of Z relative to separation distance s between emitter source(s) 120 and detectors 140, the difference (e1) in travel times between two light paths is relatively constant, and changes very little with target object 20 distance. According to the present invention, when electrical calibration is performed, e1 is assumed to be constant over the entire operating range. But when target object 20 is moved closer to system 200, the travel-time difference can change substantially, as depicted in FIG. 6A by e2. The magnitude of the change, an error in the otherwise-correct electrical model, is dependent on separation distance s. The smaller the separation s, the smaller the change in travel time. In the ideal case, s=0 and the error would be zero.

The error due to the difference in travel times between emitted and reflected light rays is termed elliptical error, as the locations of the sensor and the light source define an ellipsoid corresponding to points of fixed phase delay. Beyond a certain distance from the sensor, points of fixed phase delay resemble more of a sphere, and the elliptical error becomes zero.

Figure 6B:
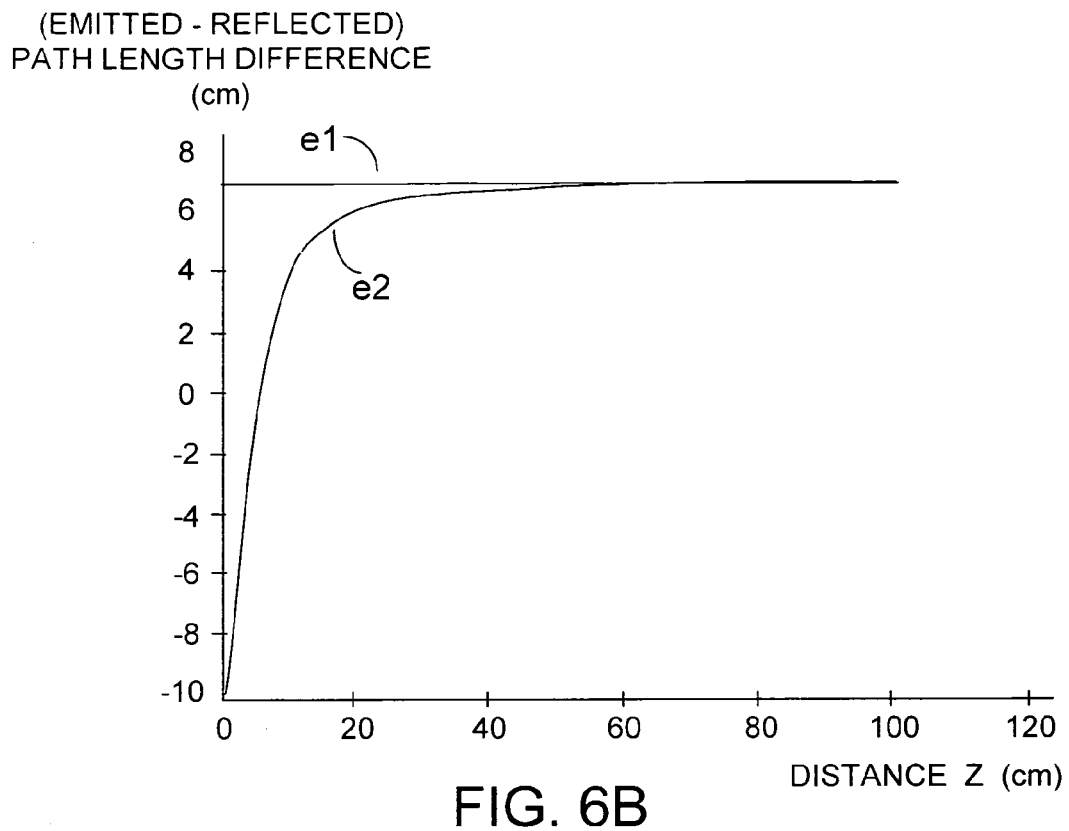
FIG. 6B depicts optical path differences that give rise to elliptical error, according to an embodiment of the present invention.
Figure 6C:
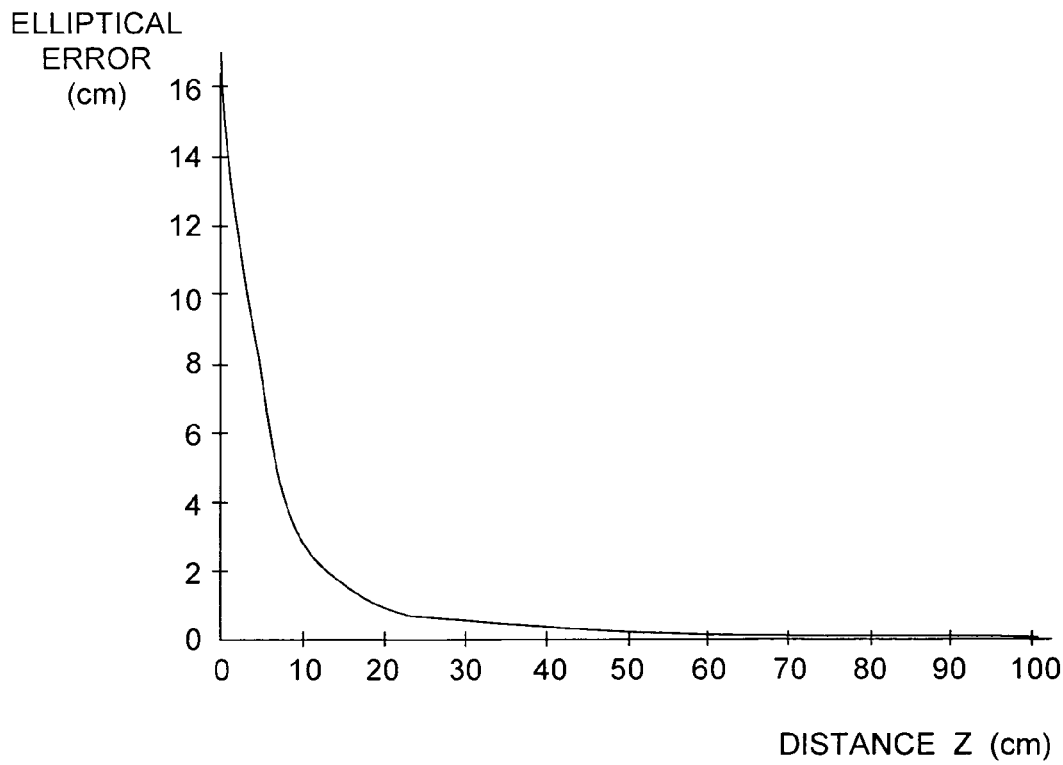
FIG. 6C depicts elliptical error for the sensor pixel whose data is shown in FIG. 6B, according to an embodiment of the present invention.

FIG. 6B and FIG. 6C demonstrate the effect of elliptical error where separation distance s=10 cm and the viewing angle of the pixel in question is 45°. More particularly, FIG. 6B shows the (emitted light path vs. reflected light path) difference as a function of Z distance. FIG. 6C depicts resultant elliptical error, which is the first curve minus its value at infinity. From FIGS. 6B and 6C it is seen that at distance Z=30 cm, elliptical error is about 0.5 cm, and at Z=65 cm, elliptical error is about 0.1 cm. For the data shown, in practice elliptical error is substantially negligible beyond Z=65 cm for a sensor having an accuracy of 1 cm.

Figure 7A:
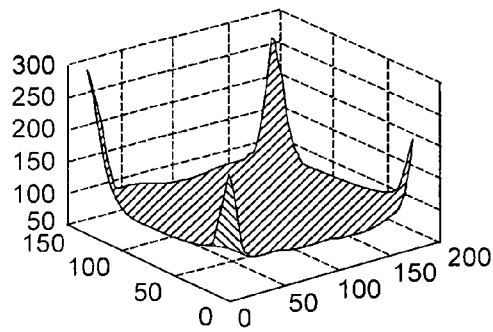
FIGS. 7A-7E depict improvement in far edge elliptical error for increasing distance Z for the sensor pixel whose data is shown in FIG. 6B, according to an embodiment of the present invention.
Figure 7B:
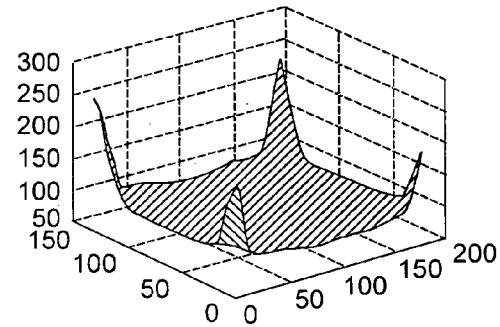
Figure 7C:
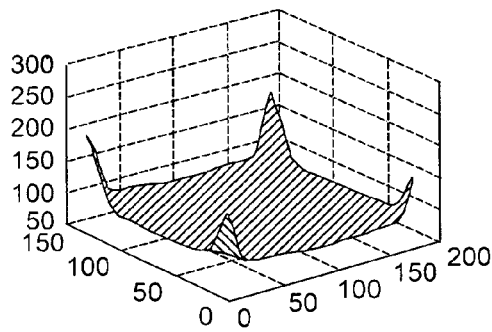
Figure 7D:
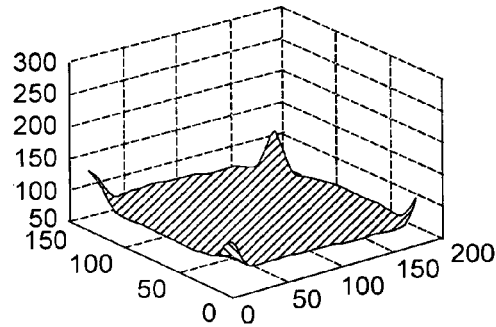
Figure 7E:
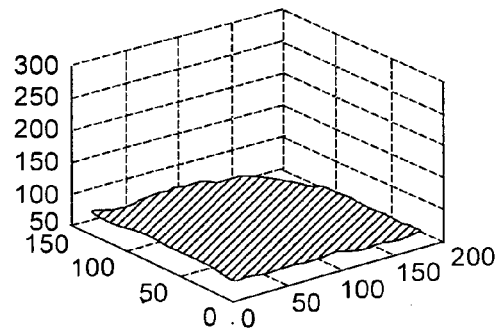

FIGS. 7A-7E are three-dimensional plots of elliptical error for the pixel sensor whose data is shown in FIGS. 6B and 6C. FIG. 7A depicts a 30 cm elliptical error at the corner regions when Z=11 cm, and a fairly negligible elliptical error otherwise. FIGS. 7B-7E depict a continuing decrease in magnitude of elliptical corner error as distance Z increases. For example, FIG. 7E depicts essentially 0 cm elliptical error for Z=50 cm, even at the corner regions. Thus, according to the present invention, electrical calibration data generated per FIG. 3B will be taken when $Z^f$=50 cm.

FIG. 8A depicts calculation of elliptical error using two sets of data points: (1) the electrical model sampled (or evaluated) at distances $Z^n$ and $Z^f$, and (2) actual phase measured from the pixel sensor at the same distances Zn and Zf. As shown in FIG. 8A at small Z values, the actual Z distance deviates from that predicted by the electrical model. For example a target object placed at distance $Z^n$ cause the system to output a phase value of $p^N$, but this phase value deviates from the value predicted by the electrical model. Hence at close range the electrical model must be augmented by a correction term termed elliptical model. The elliptical correction term when added to the electrical model provides the correct phase distance relationship for small values of Z distance.

In FIG. 8A, the difference between the two curves shown is depicted in FIG. 8B as the elliptical error model. As shown in FIG. 8B, the elliptical model is forced to be zero at $P^f$. Generally a quadratic equation can be used to model the elliptical error. The elliptical error model is added to the electrical model when the phase (e.g. $P^n$) is between $P^0$ and $P^f$. For phase values outside this range, the model is assumed to be zero. As noted, this model accounts for physical and geometric characteristics of sensors associated with TOF system 200, rather than with their electrical characteristics. With respect to elliptical model calibration nomenclature associated with FIG. 8A and FIG. 8B for data associated with a pixel sensor (i,j), preferably four additional parameters can be defined. $P^{Oij}$ is understood to be part of the electrical model, where $P_{Oij}$, $P^{nij}$, and $P^{fij}$ are phase range limits wherein elliptical correction is to be applied, and $K^{ij}$ are correction curve parameters that are forced to be zero at $P^{Oij}$. In a preferred embodiment, two correction curve parameters $K_{ij}$ are used for a second order model.

Figure 9A:
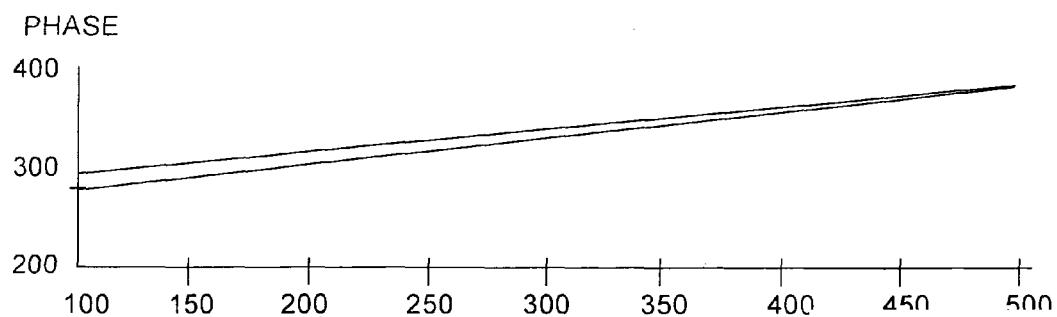
FIG. 9A depicts phase vs. distance data and the electrical model according to an embodiment of the present invention.
Figure 9B:
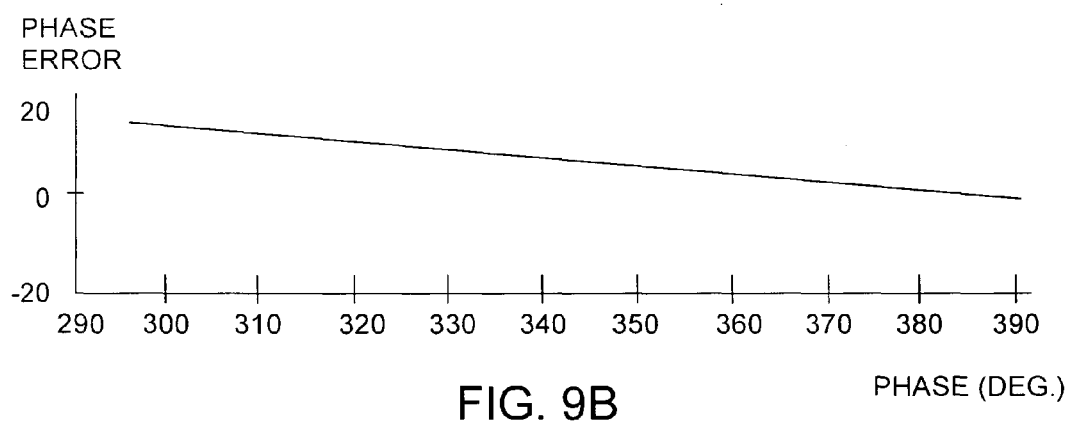
FIG. 9B depicts the phase error obtained by taking the difference between the two curves depicted in FIG. 9A, according to an embodiment of the present invention.
Figure 9C:
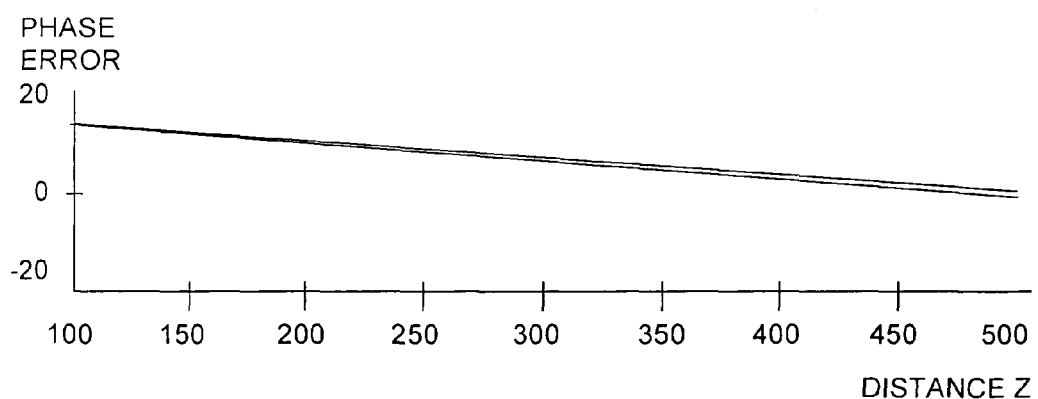
FIG. 9C depicts the phase data from 9B and an elliptical model obtained using curve fitting for the data shown in FIG. 9B, according to an embodiment of the present invention.

Using actual sensor data depicted in FIGS. 8A and 8B, FIG. 9A depicts phase-vs-distance curves for a 360° phase sweep of the same electrical model evaluated at two distances. The uppermost trace in FIG. 9A depicts measured phase-vs-distance data, whereas the lowermost trace depicts the electrical model predicted data. Phase error is the difference between the two curves shown in FIG. 9A, which difference is depicted in FIG. 9B. FIG. 9C depicts the resultant elliptical model obtained by curve fitting data shown in FIG. 9B. It is seen from FIG. 9C that model performance is very good.

A single light source 120 was used in describing many of the above embodiments. However in practice preferably multiple light elements 120 may be used, e.g., laser, LED, VCSEL, etc. are used. When multiple light sources are used, elliptical error may increase because of possible phase variations between the different light elements. At far range Z, where the data for electrical calibration is taken, illumination from emitters 120 tends to be substantially more uniform. In practice, phase variations between individual light sources 120 are not an issue. But as Z decreases and target object 20 moves closer to system 200, target object illumination becomes less uniform. Some areas of target object 20 receive light only from certain light elements 120. This illumination variation adds to the elliptical error, but this error contribution can be modeled as part of elliptical correction, as will now be described.

It is possible to construct pure (i.e., geometry dependent) elliptical error analytically from the specifications of all the system 200 components. But in practice, light sources 120 non-idealities make this error much more complex and rather difficult to predict. One could create an elaborate model that takes into account all the factors involved including phase variations between different light elements 120, non-uniformity of the illumination pattern, relative geometry of the light source and sensor array 130. However, such a model is likely to be very complex and time consuming to build as well as to evaluate.

According to an embodiment of the present invention, elliptical error preferably is modeled using measured data acquired at near range, $Z<Z^f$. A number, e.g., K, of distances are selected for which sensor phase data is collected. How many distances to use will depend upon the system 200 distance accuracy requirement and the design of system 200. Such factors can include relative geometry of sensor array 130 and light source(s) 120, phase variations between light source(s) 120, uniformity of illumination, etc. In practice, experimental data suggest that two to five distances are sufficient for most camera systems. FIG. 8A depicts K=2 data points acquired for $Z<Z^f$.

Once the phase data (Phase_Measured) is acquired for K distances, calibration according to the present invention carries out the following steps:

(1) With reference to FIG. 3B, and FIGS. 9A-9C, the entire electrical model is constructed, and the set of K phases (Phase_Electrical) corresponding to K distances for which elliptical data is available is extracted.

(2) the phase correction function is calculated: Perr=Phase_Measured−Phase_Electrical.

(3) With reference to exemplary FIG. 3C, curve fitting is performed whereby data points of Perr are fit to an analytical model that is a function of phase. Constructing the analytical model of Perr preferably is carried out by fitting the data to an exponential, polynomial or other such function. It is usually sufficient to use such a function with two or three parameters to adequately model the elliptical error. This analytical model can be stored in memory 210, after which data gathered to form the model can be purged from memory. Note that Perr is a correction term for the phase before electrical calibration is applied. At this juncture, distance $Z^f$ is known, e.g., the distance at which elliptical error is sufficiently small to be ignored. Once the model parameters are built and stored, e.g., in memory 210 in system 200, Perr can be evaluated efficiently at run time of system 200.

(4) the parameters of Perr are stored in a separate section of the calibration table, e.g., in a portion of memory 170, perhaps portion 210 (see FIG. 2).

Thus, the complete fast calibration method according to the present invention preferably includes the following steps:

(1) Referring to FIG. 3B, a target object 20 is placed at known $Z^f$ distance, perhaps about 50 cm to about 100 cm from system 200, to collect data for electrical calibration. The exact distance $Z^f$ depends on the design of camera system 200 and is selected such that elliptical error is negligible at this distance. As noted earlier, the same value for $Z^f$ may be used to calibrate a mass production run of a given system type, e.g., system 200. Stated different, each same system to be calibrated will involve modeling using a target object the same distance $Z^f$ from the system.

(2) As depicted in FIG. 3B and FIG. 3C, a phase sweep is performed wherein phase of the signal from exciter 115 that drives light source 120 preferably is changed from 0° to 360° in N steps. This results in N phase points for each pixel 140 in array 130. To minimize noise effects, for each phase setting, M frames (perhaps M=20) should be acquired from the sensor array and then averaged.

(3) Curve fitting is performed for the electrical model, as suggested by FIG. 3D to fit the N phase points from step (1) to a predetermined analytic function, resulting in a set of model parameters. Preferably R-to-Z conversion is also done in this step using the results of XY calibration so as to obtain the Z-distance-phase curve. R-TO-Z conversion may be carried out according to equation (4).

(4) The model parameters for all pixels 140 in array 130 preferably are stored in a calibration table 280, e.g., within memory 210 in system 200. These model parameters require typically 10% to 20% the storage needed to store data acquired using prior art "by example" calibration techniques. These stored model parameters are used during system 200 run-time evaluation as well as for elliptical error correction.

(5) Detector sensor response is acquired at K different near distances, e.g., $Z<Z^f$, for example between about 0 cm and about 50 cm to model elliptical error, e.g., as suggested by FIG. 6C, FIG. 8A, and FIG. 8B. For each such near range distance, detector sensor phase data (Phase_Measured) is acquired, preferably using M samples and averaging as above.

(6) Calculation of phase correction function: Perr=Phase_Electrical−Phase_Measured is carried out, where Phase_Electrical represent phase points obtained from the analytic model calculated in step (3), above.

Perr data points are fitted to a second analytic model that is a function of phase, and the Perr model parameters are stored in a separate portion of calibration table 210.

Figure 10:
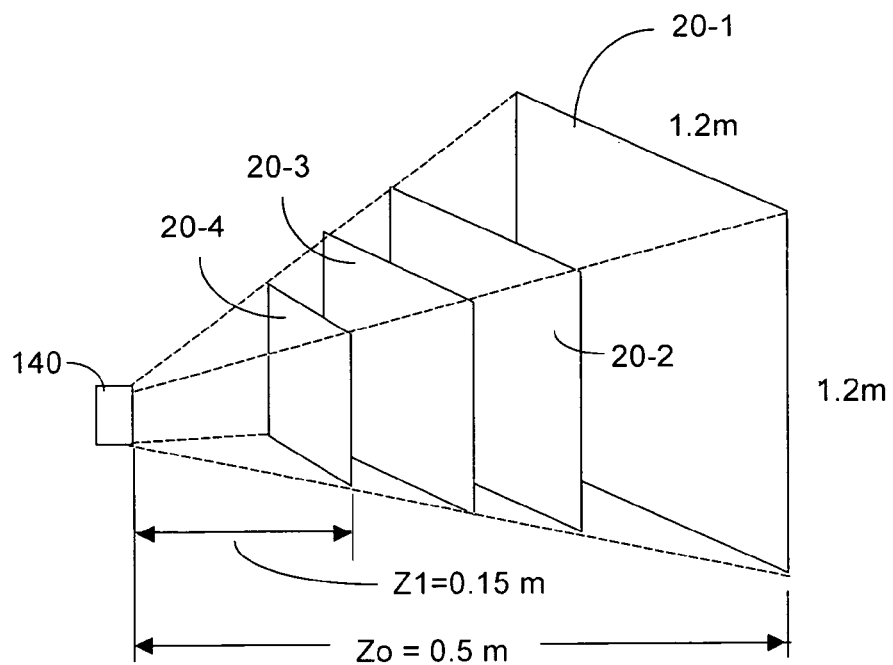
FIG. 10 depicts a calibration configuration using differently sized target objects, according to an embodiment of the present invention.

The above-described procedure can be carried out in a few minutes as contrasted with tens of minutes for prior art calibration techniques. FIG. 10 depicts an exemplary setup used for fast-Z calibration, according to the present invention. Such setup does not require expensive equipment and does not require a large physical space. In step (1) above, target object 20-1 may be the largest target as it will be further away from sensor(s) 140 than target 20-4 used in step (5). In FIG. 10, distance $Zo<Z^f$. As noted, the target can be at a fixed distance $Z^f$ to simplify electrical calibration setup. Data collection for step 2 typically requires about one to two minutes for a full phase sweep. Target object 20-4 used in step (5) may be physically smaller and closer to sensor 140 in system 200 under calibration. Target object 20-4 may be disposed in front of system 200 robotically in automated fashion, or manually. Data collection for step (5) takes but a few seconds. Indeed, from start to finish, calibration for each system 200 undergoing calibration can be completed in five minutes or less.

Figure 11:
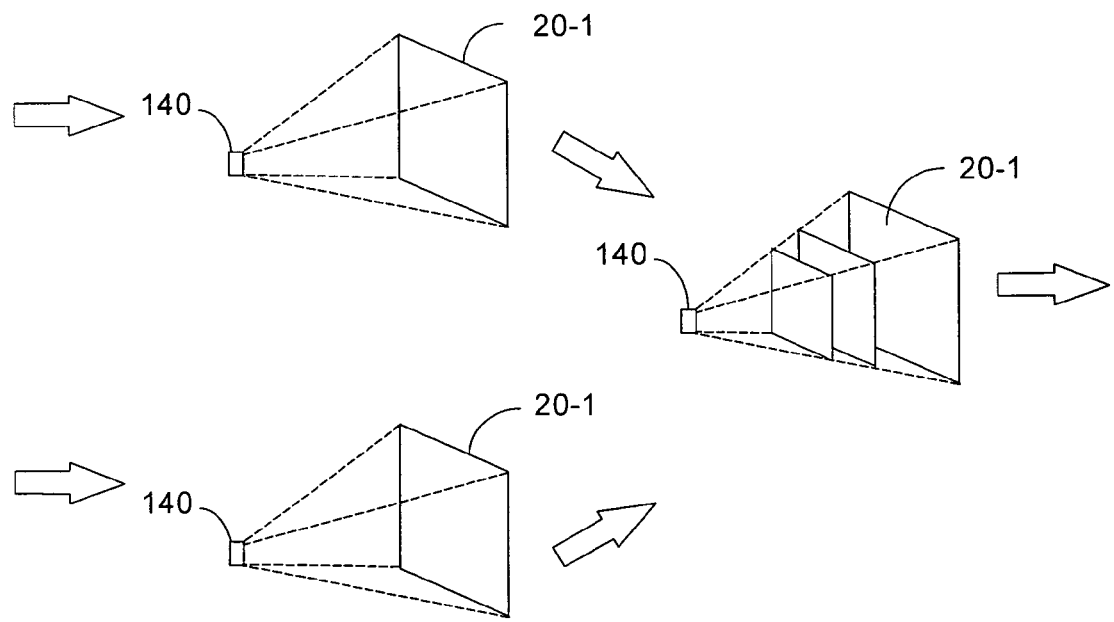
FIG. 11 depicts use of parallelization and/or pipelining to maximize calibration throughput, according to an embodiment of the present invention.

For high volume manufacturing of systems 200, parallelization and pipelining techniques can help maximize calibration throughput, e.g., the number of systems 200 to be calibrated per unit time. FIG. 11 replicates in somewhat simplified form the depiction of FIG. 10. Preferably the phase sweep operation of step (2) above is performed simultaneously for two separate systems 200, using two separate calibration stations. Step (2) is the most time consuming step in calibration according to the present invention, and parallelization as depicted in FIG. 11 increases calibration throughput. The two parallel-operating calibration stations depicted in FIG. 11 feed into a third calibration station that collects data for elliptical error modeling step (5). In this manner, the calibration process can produce one calibrated unit 200 every one to two minutes. Understandably greater throughput can be achieved use additional parallelization and/or pipeline stages.

An exemplary evaluation procedure that determines Z distance from phase according to an embodiment of the present invention will now be described. The output of a three-dimensional camera 200 is geometrical data obtained from acquired phase information. The conversion from phase to geometrical data preferably is done using information stored in calibration table 210, stored in memory associated with the three-dimensional camera system. Given a system 200 detected phase p, the corresponding Z is calculated as follows:

(1) Calculate elliptical correction Perr(p) from the model of the elliptical error that is preferably stored in memory associated with system 200, e.g., within memory 170.

(2) Adjust phase: p=p−Perr(p)

(3) Use the memory-stored elliptical model of distance-vs-phase curve to obtain distance: Z=Evaluate_DPcurve(p).

Several methods can be used to calculate Z at system 200 run time. One method is to perform evaluations of the analytic models of elliptical error and distance-phase curves at runtime. For such approach, model evaluation can be sped up by storing pre-calculated tables of the basic functions used in these models. For example, the "sin" function of the distance-vs-phase curve can be tabulated over a range of 360° with a step size sufficiently small to maintain error within noise limits of sensors 140 in array 130. A more efficient implementation of the "sin" function could also be used. While such implementation would be slightly less accurate than an exact "sin" function, it can be made sufficiently accurate for the purposes of producing Z values. Another approach is to create a standard calibration table as per the "by-example" method. This can be accomplished by tabulating the models themselves over a range of 360° using a small step size to limit subsequent interpolation errors.

To summarize, a fast-Z calibration procedure according to the present invention is a very efficient method of calibration. Such procedure does not require a moving target, and most of the data capture is done at one fixed distance $Z^f$ that is not far from the system under calibration. As such, the physical space needed for calibration is reasonable. Fast-Z calibration according to the present invention utilizes XY calibration and requires an acceptable level of accuracy from such XY calibration. Embodiments of the present invention preferably capture phase data at a few distances close to the system under calibration, to model complex elliptical error. This step can be accommodated without much difficulty during calibration setup. Analytic models of the distance-phase curve and elliptical error preferably ensure that any error involved in evaluating these models is minimized.

While embodiments of the present invention have been described with respect to phase-based TOF type systems, the underlying approach should be adaptable to systems that acquire other type of data. For example, U.S. Pat. No. 6,323, 942 CMOS-Compatible Three-Dimensional Image Sensor IC, assigned to Canesta, Inc., assignee herein, describes a pure TOF system. Z distance is determined by the round trip time for optical energy to be emitted by the TOF system, to reflect off a target object, and to be detected by the TOF system. Although not yet tested, calibration of the sensor array within such TOF system might be accomplished by injected time delay into the emitted optical energy, such that more injected time delay would emulate a target object farther away. In the broadest sense, then, the present invention encompasses rapid calibration of a system that detects one parameter (e.g., phase, or time) to determine a desired value, e.g., distance to a target object. Calibration according to embodiments of the present invention involves injected into such system perturbations into the detected parameter to emulate repositioning of the target object. In constructing the electrical model, it is understood that a sufficient number of samples must be acquired to adequately represent the phase-vs-distance curve. It is also understood that phase increments need not be equal in magnitude, e.g., some phase increments may be smaller or larger than others. For example if the phase-vs-distance curve changes slowly in a region, fewer phase samples will suffice for that region.

Modifications and variations may be made to the disclosed embodiments without departing from the subject and spirit of the invention as defined by the following claims.

What is claimed is:

1. A method of calibrating a time-of-flight (TOF) system of the type that emits optical energy of a known phase, detects a portion of said optical energy reflected from a target object a distance Z away, and determines Z by examining phase shift in detected reflected optical energy relative to said known phase of emitted optical energy, the method comprising the following steps:
   (a) disposing a target object a distance $Z^x$ from said TOF system, said distance $Z^x$ being within operating distance range of said TOF system;
   (b) altering said known phase of said emitted optical energy by at least two known phase values;
   (c) for each known phase value of said emitted optical energy, determining from detected reflected optical energy a corresponding phase shift relative to said known phase;
   (d) using corresponding relative phase shift determined at step (c) to form an electrical model of detection characteristics of said TOF system;
   (e) storing data representing said electrical model;
   wherein data stored at step (e) is useable during run-time operation of said TOF system to provide calibrated values of Z responsive to phase shift in detected reflected optical energy.

2. The method of claim 1, where said $Z^x$ is a shortest distance $Z^f$ whereat elliptical error arising from geometry of phase detection of said TOF system is negligible.

3. The method of claim 1, wherein step (b) includes sweeping said first phase with incremental values of phase having at least one characteristic selected from a group consisting of (i) increments between each of said phase values are equal in magnitude, (ii) increments between at least some of said phase values have different magnitude, and (iii) sweeping encompasses substantially a range of about 0° to about 360°.

4. The method of claim 1, wherein step (e) includes storing said data representing said electrical model within said TOF system.

5. The method of claim 1, wherein step (d) includes forming said electrical model as a parametric function characterized by at least two parameters.

6. The method of claim 1, wherein step (b) includes sweeping said known phase with incremental values of phase exceeding 360°, and wherein step (d) includes unwrapping relative phase shift determined at step (c) to avoid distance ambiguity.

7. The method of claim 1, wherein said model formed at step (d) includes a linear factor and a sinusoid factor.

8. The method of claim 1, wherein:
   said TOF system includes an array of detectors;
   said model formed at step (d) approximates $Z = ZUD_{ij} \cdot [p + m_{ij} + A_{ij}\sin(s_{ij}p + 2\pi fp)]$, where at least two parameters of $ZUD_{ij}$, $m_{ij}$, $A_{ij}$, and $s_{ij}$ are per detector parameters, f is a global TOF system parameter, and p is phase.

9. The method of claim 1, further including a step of dealiasing phase shift in said detected reflected optical energy, whereby said electrical model formed at step (d) is useable during run-time operation of said TOF system for unwrapped phase exceeding 360°.

10. The method of claim 1, wherein step (d) further includes forming an elliptical error model to correct phase-vs-distance data for geometric characteristics of said TOF system.

11. The method of claim 10, wherein said elliptical model formed at step (d) is useable when $Z<Z^f$, where $Z^f$ is a shortest distance at which elliptical error for said TOF system is negligible.

12. The method of claim 10, wherein forming an elliptical error model includes the following steps:
(i) disposing a target object at at least one distance $Z^y Z<^f$ from said TOF system, where $Z^f$ is a shortest distance whereat elliptical error arising from geometry of phase detection of said TOF system is negligible;
(ii) for each said distance $Z^y$, determining from detected reflected optical energy a corresponding phase shift relative to said known phase;
(iii) for each said distance $Z^y$, obtaining a phase value from said electrical model formed at step (d);
(iv) obtaining a difference in phase value between phase determined at step (ii) and phase obtained from step (iii), and using said difference in phase to form an elliptical error model;
wherein said elliptical error model is useable during run-time operation of said TOF system to provide improved calibrated values of $Z<Z^f$ responsive to phase shift in detected reflected optical energy.

13. The method of claim 12, wherein step (iv) includes forming said elliptical error model as a parametric function.

14. A method of improving elliptical error calibration in a time-of-flight (TOF) system of the type that emits optical energy of a known phase, detects a portion of said optical energy reflected from a target object a distance Z away, and determines Z by examining phase shift in detected reflected optical energy relative to said known phase of emitted optical energy, the method comprising the following steps:
(i) disposing a target object at at least one distance $Z^y<Z^f$ from said TOF system, where $Z^f$ is a shortest distance whereat elliptical error arising from geometry of phase detection of said TOF system is negligible;
(ii) for each said distance $Z^y$ determining from detected, reflected optical energy a corresponding phase shift relative to said known phase;
(iii) for each said distance $Z^y$, obtaining a phase value from an electrical model of phase-vs-distance formed for said TOF system;
(iv) obtaining a difference in phase value between phase determined at step (ii) and phase obtained from step (iii), and using said difference in phase to form an elliptical error model;
wherein said elliptical error model is useable during run-time operation of said TOF system to provide improved calibrated values of $Z<Z^f$ responsive to phase shift in detected reflected optical energy.

15. The method of claim 14, wherein step (iv) includes forming said elliptical error model as a parametric function.

16. The method of claim 14, wherein step (iv) includes storing said elliptical error model in memory useable by said TOF system during run-time operation of said TOF system.

17. A time-of-flight (TOF) system of the type that emits optical energy of a known phase, detects a portion of said optical energy reflected from a target object a distance Z away, and determines Z by examining phase shift in detected reflected optical energy relative to said known phase of emitted optical energy, the TOF including means for altering known phase emitted by said TOE system, and further including memory storing a distance-vs-phase calibration model used to calibrate said TOF system, said calibration model obtained according to a method comprising the following steps:
(a) disposing a target object a distance $Z^x$ from said TOF system, said distance $Z^x$ being within operating distance range of said TOF system;
(b) causing said means for altering known phase to vary said known phase of said emitted optical energy by at least two known phase values;
(c) for each known phase value of said emitted optical energy, determining from detected reflected optical energy a corresponding phase shift relative to said known phase;
(d) using corresponding relative phase shift determined at step (c) to form an electrical model of detection characteristics of said TOE system;
(e) storing data representing said electrical model in said memory;
wherein data stored in memory at step (e) is useable during run-time operation of said TOF system to provide calibrated values of Z responsive to phase shift in detected reflected optical energy.

18. The TOF system of claim 17, wherein at step (a), said $Z^x$ is a shortest distance $Z^f$ whereat elliptical error arising from geometry of phase detection of said TOF system is negligible.

19. The TOF system of claim 17, wherein said memory further includes an elliptical model of detection characteristics of said TOF system that are substantially independent of electrical characteristics, said elliptical model being used at distances $Z<Z^f$, where $Z^f$ is a shortest distance at which elliptical error is substantially negligible.

20. The TOF system of claim 19, wherein said elliptical model of detection characteristics stored in said memory is formed as follows:
(i) disposing a target object at at least one distance $Z^y<Z^f$ from said TOF system, where $Z^f$ is a shortest distance whereat elliptical error arising from geometry of phase detection of said TOE system is negligible;
(ii) for each said distance $Z^y$, determine from detected reflected optical energy a corresponding phase shift relative to said known phase;
(iii) for each said distance $Z^y$, obtain a phase value from said electrical model formed at step (d);
(iv) obtain a difference in phase value between phase determined at step (ii) and phase obtained from step (iii), and use said difference in phase to form an elliptical error model;
wherein said elliptical error model is useable during run-time operation of said TOF system to provide improved calibrated values of $Z<Z^f$ responsive to phase shift in detected reflected optical energy.

* * * * *